(12) United States Patent
Turchi et al.

(10) Patent No.: US 8,988,048 B2
(45) Date of Patent: Mar. 24, 2015

(54) CIRCUIT FOR GENERATING A CLOCK SIGNAL FOR INTERLEAVED PFC STAGES AND METHOD THEREOF

(75) Inventors: Joel Turchi, Gagnac sur Garonne (FR); Stéphanie Conseil, Colomiers (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 620 days.

(21) Appl. No.: 13/263,319

(22) PCT Filed: Apr. 28, 2009

(86) PCT No.: PCT/US2009/041977
§ 371 (c)(1),
(2), (4) Date: Oct. 6, 2011

(87) PCT Pub. No.: WO2010/126489
PCT Pub. Date: Nov. 4, 2010

(65) Prior Publication Data
US 2012/0032652 A1    Feb. 9, 2012

(51) Int. Cl.
| G05F 1/613 | (2006.01) |
| G05F 1/40 | (2006.01) |
| H02M 1/42 | (2007.01) |
| H02M 1/08 | (2006.01) |

(52) U.S. Cl.
CPC .............. *H02M 1/4225* (2013.01); *H02M 1/08* (2013.01); *Y02B 70/126* (2013.01)

USPC .......................................... 323/225; 323/271

(58) Field of Classification Search
USPC .......... 323/222, 225, 271, 282, 285; 327/278, 327/285
See application file for complete search history.

(56) References Cited

U.S. PATENT DOCUMENTS

| 4,249,120 | A | * | 2/1981 | Earle ............................. 318/729 |
| 5,592,128 | A | | 1/1997 | Hwang |
| 5,742,247 | A | * | 4/1998 | Chujo ............................ 341/144 |
| 6,628,106 | B1 | | 9/2003 | Batarseh |
| 6,967,851 | B2 | * | 11/2005 | Yang et al. ...................... 363/16 |
| 7,038,519 | B1 | * | 5/2006 | Pang et al. ..................... 327/278 |
| 7,327,127 | B2 | * | 2/2008 | Ho ................................. 323/271 |
| 8,008,902 | B2 | * | 8/2011 | Melanson et al. ............. 323/285 |
| 8,519,687 | B2 | * | 8/2013 | Kudo ............................. 323/282 |
| 8,587,280 | B2 | * | 11/2013 | Colbeck et al. ............... 323/282 |
| 2007/0252622 | A1 | * | 11/2007 | Saenz et al. ..................... 327/72 |
| 2010/0141225 | A1 | * | 6/2010 | Isham et al. .................. 323/282 |

OTHER PUBLICATIONS

Renesas, R2A20112SP/DD, "Critical Conduction Mode Interleaved PFC Control IC", REJ03D0904-0200 Rev.2.00, Nov. 13, 2007.

(Continued)

*Primary Examiner* — Adolf Berhane
(74) *Attorney, Agent, or Firm* — Rennie William Dover

(57) ABSTRACT

A method and circuit for generating a clock signal. A power factor correction circuit has n channels operating out of phase and independently. The circuit is able to generate a clock signal for each channel according to the current cycle duration of each channel.

11 Claims, 3 Drawing Sheets

(56) References Cited

OTHER PUBLICATIONS

Texas Instruments, UCC28060, Natural Interleaving Dual-Phase Transition-Mode PFC Controller, slus767e—May 2007—Rev. Nov. 2008 www.ti.com.

Chan, C.H. et al, "Input Current Analysis of Interleaved Boost Converters Operating in Dinscontinuous-Inductor-Current Mode", Power Electronics Specialists Conference, 28th Annual IEEE St. Louis MO., Use Jun. 22-27, 1997, IEEE, vol. 1, Jun. 22, 1997, pp. 392-398, USA.

* cited by examiner

150

160

CIRCUIT FOR GENERATING A CLOCK SIGNAL FOR INTERLEAVED PFC STAGES AND METHOD THEREOF

TECHNICAL FIELD

The present invention relates, in general, to power supplies and, more particularly, to interleaved power factor correction stages in power supplies.

BACKGROUND

Voltage regulators that provide AC/DC rectification typically include a full wave voltage rectifier stage, such as, for example, a diode bridge, a main Switch Mode Power Supply (SMPS) stage, and a Power Factor Correction (PFC) stage inserted between the line and the main SMPS. The SMPS provides regulation of an output waveform and the PFC stage draws a sinusoidal current from the line and provides Direct Current (DC) voltage to the main SMPS. Depending on the desired output power, the PFC stage may include a large inductor. However, large inductors are unsuitable for use in systems such as, for example, Liquid Crystal Display (LCD) television power supplies, in which it is desirable to use components having low profiles. To decrease the size of the magnetic components of a PFC stage and thereby lower their profile, manufacturers split the PFC stage into smaller parallel sub-stages that operate out of phase from each other. When the PFC stage is split into two parallel sub-stages they operate 180 degrees out of phase from each other. This configuration is referred to as being an interleaved PFC. Generally, the two PFC stages operate in Critical Conduction Mode (CRM). Because the two PFC stages are out-of-phase from each other, the total input current has the shape of a continuous conduction mode PFC which results in a lower input/output Root Mean Square (RMS) current and easier Electromagnetic Interference (EMI) filtering of the power supply. A drawback with the CRM operating mode is that the switching frequency varies as a function of the line voltage and the power, which precludes the use of a traditional oscillator to achieve the desired phase relationship between the sub-stages. One technique for overcoming this drawback is a master/slave approach where one branch is the master and the other branch is the slave. Here the master branch operates as a CRM single phase PFC. The main challenge of this technique is to maintain the CRM operation, as an unbalance between the PFC stages or a disturbance in the circuit may cause the slave branch to operate either in Continuous Conduction Mode (CCM) or in a discontinuous conduction mode (DCM). Thus, this approach may require some complex and expensive circuitry. Another technique is to operate both branches independently from each other. Here, each phase operates independently in CRM and interacts to set the proper 180° phase shift.

Accordingly, it would be advantageous to have a circuit and method for generating a clock signal for each branch of an interleaved PFC stage. It would be of further advantage for the circuit and method to be cost efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

DETAILED DESCRIPTION

Generally, the present invention provides a method and a circuit for generating a clock signal. Preferably, the circuit is a switched mode power supply operating in DCM or in CRM having a clock generation circuit that includes an oscillator. In accordance with an embodiment, an oscillator capacitor is charged by a charging current source until its voltage reaches an upper reference or upper threshold voltage level. Then the oscillator capacitor discharges until its voltage goes below a lower reference or lower threshold voltage level. The upper threshold voltage level is labeled $V_{OSCH}$ and the lower threshold voltage level is labeled $V_{OSCL}$. By way of example, the upper reference voltage level is 3.5 volts and the lower reference voltage level is 2.5 volts. The oscillator capacitor is also referred to as an energy storage element. A hysteresis comparator monitors the voltage across the oscillator capacitor and generates an output signal SYNC that is high for the discharge time of the oscillator capacitor and low otherwise. In accordance with a two-phase embodiment, a divider circuit forms a divided signal PHASE1 from the output signal SYNC. A divided signal PHASE2 is formed from divided signal PHASE1, where signals PHASE1 and PHASE2 are out of phase from each other by 180 degrees. The PFC stage includes latches for each sub-stage. The output of the latch for the PHASE1 stage is set high when the output signal SYNC occurs while signal PHASE1 is high and the output of the latch for the PHASE2 stage is set high when the output signal SYNC occurs while signal PHASE2 is high. Clock signals CLK1 and CLK2 are generated when output signal SYNC is low, i.e., when the voltage across the oscillator capacitor is less than 2.5 volts, i.e., less than voltage level $V_{OSCL}$, as a result of the output voltage of the latch 130 and an inverted output signal SYNCbar for the PHASE1 branch and as a result of the output voltage of latch 134 and the inverted output signal SYNCbar for the PHASE 2 branch. Each latch resets when a corresponding drive signal turns high.

Figure 1:
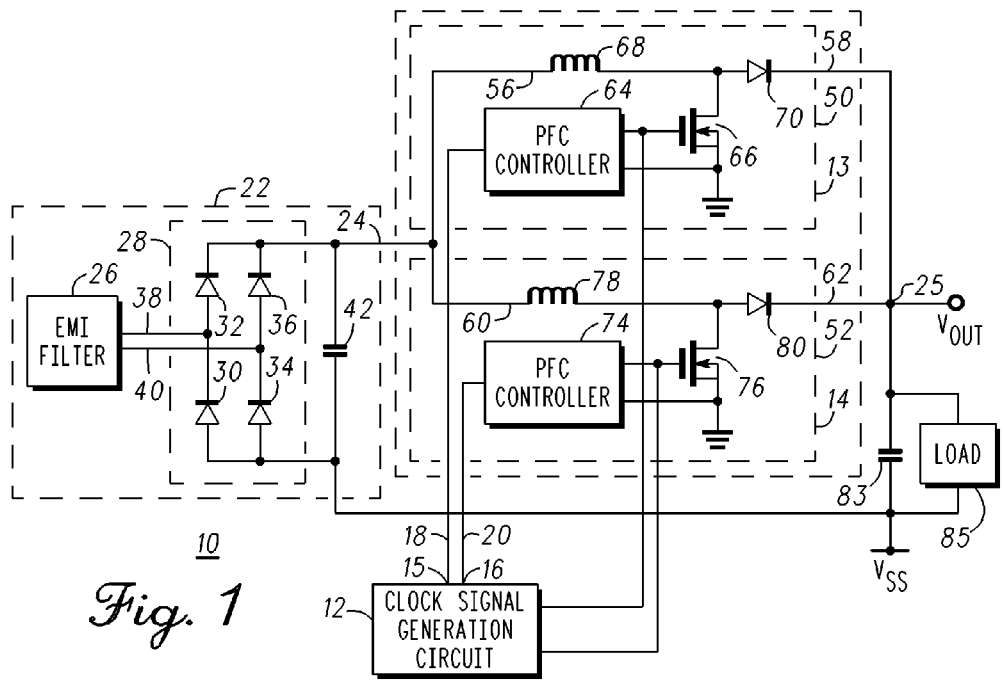
FIG. 1 is a schematic diagram of a power factor correction circuit comprising a clock signal generation circuit coupled to power factor correction stages in accordance with an embodiment of the present invention.

FIG. 1 is a schematic diagram of a Power Factor Correction (PFC) circuit 10 comprising a clock signal generation circuit 12 coupled to interleaved PFC stages 50 and 52 in accordance with an embodiment of the present invention. The outputs 15 and 16 of clock signal generation circuit 12 are connected to inputs 18 and 20 of PFC circuit 10. In addition, an input stage 22 is connected to an input 24 of PFC circuit 10. Input stage 22 is comprised of an Electromagnetic Interference (EMI) filter 26 having inputs coupled for receiving an Alternating Current (AC) signal from an AC line and outputs connected to a rectification network 28. By way of example, rectification network 28 includes two pairs of diodes where one pair comprises a diode 30 having an anode coupled for receiving a source of operating potential such as, for example, $V_{SS}$, and a cathode connected to the anode of a diode 32 and to an output 38 of EMI filter 26. The cathode of diode 32 is connected to input 24 of PFC circuit 10. The second pair of diodes comprises a diode 34 having an anode coupled for receiving a source of operating potential such as, for example, $V_{SS}$, and a cathode connected to the anode of a diode 36 and to an output 40 of EMI filter 26. The cathode of diode 36 is connected to input 24 of PFC circuit 10. A filtering capacitor 42 has a terminal connected to input 24 of PFC circuit 10 and to the cathodes of diodes 32 and 36 and a terminal coupled to the anodes of diodes 30 and 34 and for receiving source of operating potential $V_{SS}$.

PFC circuit 10 comprises a power factor correction stage 50 having an input 56 connected to input 24 of PFC circuit 10 and an output 58 connected to an output node 25 of PFC circuit 10. Similarly, power factor correction stage 52 has an input 60 connected to input 24 of PFC circuit 10 and an output 62 connected to an output node 25 of PFC circuit 10. Power factor correction stage 50 includes a power factor correction controller 64 having an output commonly connected to the gate terminal of a power Field Effect Transistor (FET) 66 and to an input of clock signal generation circuit 12, a terminal connected to the source terminal of power FET 66, and an input 18 connected to output 15 of clock signal generation circuit 12. An inductor 68 and a diode 70 are connected to the drain terminal of power FET 66, where inductor 68 is connected between input 56 and the drain terminal of power FET 66 and the anode of diode 70 is connected to the drain terminal of power FET 66. An inductor is also referred to as a coil. The cathode of diode 70 serves as output 58 of power factor correction stage 50. Power factor correction stage 52 includes a power factor correction controller 74 having an output commonly connected to the gate terminal of a power FET 76 and to an input of clock signal generation circuit 12, a terminal connected to the source terminal of power FET 76, and an input 20 connected to output 16 of clock signal generation circuit 12. An inductor 78 and a diode 80 are connected to the drain terminal of power FET 76, where inductor 78 is connected between input 60 and the drain terminal of power FET 76 and the anode of diode 80 is connected to the drain terminal of power FET 76. The cathode of diode 80 serves as output 62 of power factor correction stage 52. By way of example, power factor correction controllers 64 and 74 may be power factor controllers such as part number NCP1601A or NCP1601B sold by Semiconductor Components Industries, LLC. A capacitor 83 has a terminal connected to node 25 and a terminal connected for receiving source of operating potential $V_{SS}$. A load 85 is coupled between node 25 and, for example, source of operating potential $V_{SS}$. Output signal $V_{OUT}$ appears at node 25.

Figure 2:
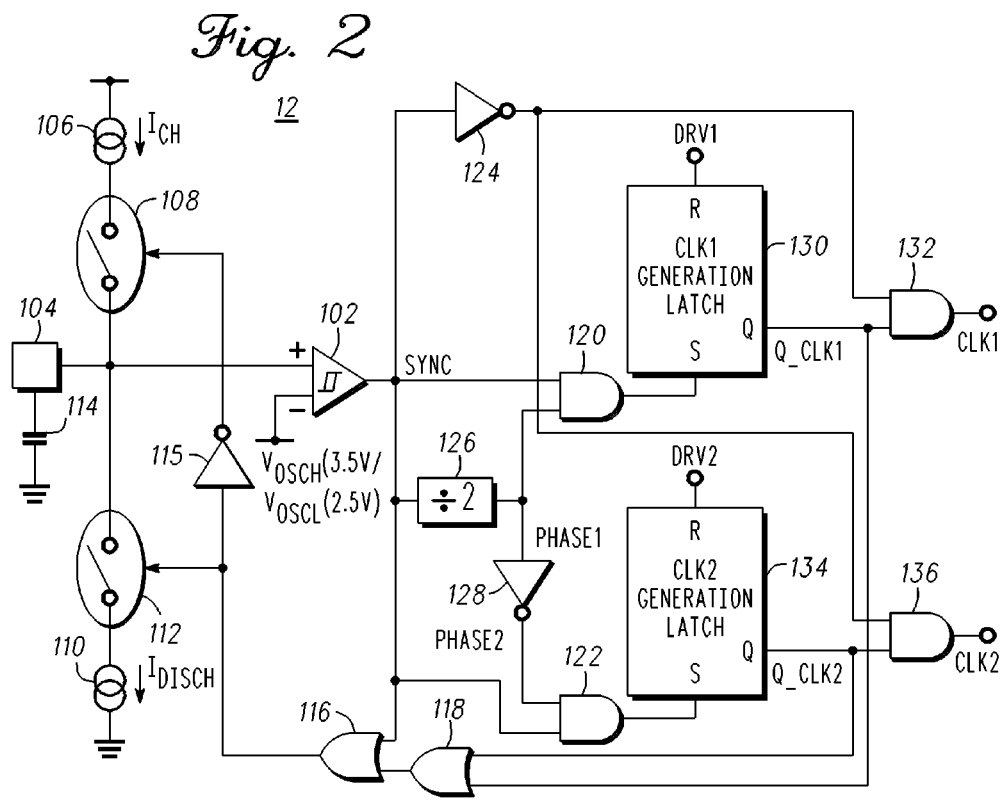
FIG. 2 is a schematic diagram of the clock signal generation circuit of FIG. 1 in accordance with an embodiment of the present invention.

Referring now to FIG. 2, a schematic diagram of clock signal generation circuit 12 of FIG. 1 is shown. Clock signal generation circuit 12 comprises a hysteresis comparator 102 having a non-inverting input, an inverting input, and an output. The inverting input is coupled for receiving a hysteresis reference voltage having a high oscillator reference voltage ($V_{OSCH}$) and a low oscillator reference voltage ($V_{OSCL}$). By way of example, oscillator reference voltage $V_{OSCH}$ is about 3.5 volts and oscillator reference voltage $V_{OSCL}$ is about 2.5 volts. The non-inverting input is coupled to an input node 104. In addition, the inverting input terminal is coupled to a current source 106 through a switch 108 and to a current source 110 through a switch 112. One terminal of an oscillator capacitor 114 is connected to input node 104 and the other terminal of oscillator capacitor 114 is coupled for receiving a source of operating potential such as, for example, ground. The output of hysteresis comparator 102 is connected to an input of a two-input OR gate 116. The other input of two-input OR gate 116 is connected to the output of a two-input OR gate 118.

The output of two-input OR gate 116 is connected to a control terminal of switch 112. The connections to the inputs of two-input OR gate 118 are further described below. The output of two-input OR gate 116 is also coupled to the control terminal of switch 108 through an inverter 115. The output of hysteresis comparator 102 is connected to the inputs of two-input AND gates 120 and 122, to the input of inverter 124, and to the input of a frequency divider circuit 126 for transmitting a synchronization signal SYNC. Inverter 124 transmits an inverted synchronization signal SYNCbar. The output of frequency divider circuit 126 is coupled to the other input of two-input AND gate 122 through an inverter 128 and to the other input of two-input AND gate 120. The output of AND gate 120 is connected to the set input of a clock generation latch 130. The reset input of clock generation latch 130 is a rising edge triggered input that is coupled for receiving a drive signal DRV1. The output of clock generation latch 130 is connected to an input of a two-input AND gate 132 and to an input of two-input OR gate 118. The other input of two-input AND gate 132 is connected to the output of inverter 124 for receiving inverted synchronization signal SYNCbar. The output of AND gate 132 transmits a clock signal CLK1. The output of AND gate 122 is connected to the set input of a clock generation latch 134. The reset input of clock generation latch 134 is a rising edge triggered input that is coupled for receiving a drive signal DRV2. The output of clock generation latch 134 is connected to an input of a two-input AND gate 136 and to the other input of two-input OR gate 118. The other input of two-input AND gate 136 is connected to the output of inverter 124 for receiving inverted synchronization signal SYNCbar. The output of AND gate 136 transmits clock signal CLK2. It should be noted that the conduction path from input/output node 104 through hysteresis comparator 102, frequency divider circuit 126, AND gate 120, clock generation latch 130, and AND gate 132 form a clock channel or branch and the conduction path from input/output node 104 through hysteresis comparator 102, frequency divider circuit 126, AND gate 122, clock generation latch 134, and AND gate 136 form another clock channel or branch. Although clock signal generation circuit 12 is shown as a separate module from PFC stages 50 and 52, this is not a limitation of the present invention. For example, clock signal generation circuit 12 can be included in a single PFC controller capable of driving two or more PFC stages.

Figure 3:
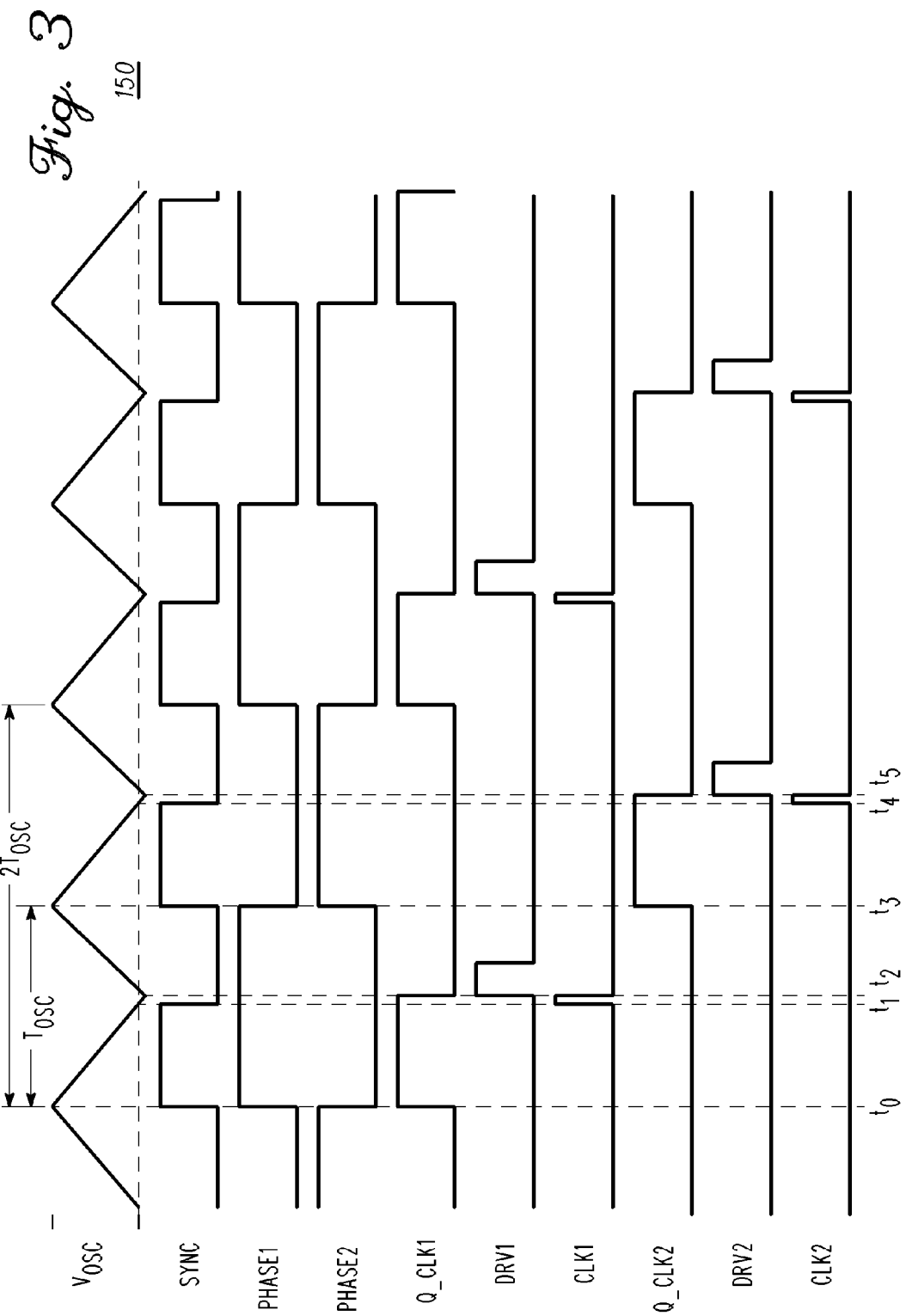
FIG. 3 is a timing diagram for the clock signal generation circuit of FIG. 2 in accordance with an embodiment of the present invention.

FIG. 3 is a timing diagram 150 that is useful for describing the operation of clock signal generation circuit 12 of FIG. 2 in accordance with an embodiment of the present invention. Before describing the operation of clock signal generation circuit 12, it should be noted that frequency divider circuit 126 shown in FIG. 2 divides the frequency of output signal SYNC by 2 to generate voltage signals PHASE1 and PHASE2. Voltage signal PHASE1 is inverted by inverter 128 to create a voltage signal PHASE2 that has substantially the same amplitude and frequency as voltage signal PHASE1. Voltage signals PHASE1 and PHASE2 identify the active clock branch when they are at logic high voltage levels. Voltage signal PHASE1 is at a logic high voltage level at the start of a current cycle in branch 1 and voltage signal PHASE2 is at a logic high voltage level at the start of a current cycle in branch 2. Voltage signals PHASE1 and PHASE2 have substantially the same amplitude as output signal SYNC but a frequency that is about half the frequency of output signal SYNC. Although frequency divider circuit 126 has been shown and described as dividing the frequency of output signal SYNC by 2, this is not a limitation of the present invention. Frequency divider circuit 126 can divide the frequency of output signal SYNC by n, where n is an integer.

Thus, divider circuit 126 may divide the frequency of output signal SYNC by 3, 4, 5, 6, . . . , n.

Still referring to FIG. 3, timing diagram 150 is a plot of signals $V_{OSC}$, SYNC, PHASE1, PHASE2, Q_CLK1, Q_CLK2, DRV1, DRV2, CLK1, and CLK2 versus time. Voltage signal $V_{OSC}$ is the voltage across oscillator capacitor 114; voltage signal SYNC is the voltage at the output of hysteresis comparator 102; voltage signals PHASE1 and PHASE2 are the channel signals that are input into AND gates 120 and 122, respectively; voltage signals Q_CLK1 and Q_CLK2 are the output signals of clock generation latches 130 and 134, respectively; clock signals CLK1 and CLK2 are the clock signals for clock signal generation circuit 12; and signals DRV1 and DRV2 are the drive signals for resetting clock generation latches 130 and 134 and cause clock signals CLK1 and CLK2 to change voltage levels, respectively.

In operation, switches 108 and 112 open and close to charge and discharge oscillator capacitor 114. More particularly, at time $t_0$ the voltage across oscillator capacitor 114 is about 3.5 volts and the output voltage of hysteresis comparator 102 is a logic high voltage. In response to oscillator capacitor 114 being at about 3.5 volts, clock signal generation circuit 12 opens switch 108 and closes switch 112 thereby disconnecting current source 106 from input/output node 104 and connecting current sink 110 to input/output node 104. Thus, a current $I_{DISCH}$ begins to discharge oscillator capacitor 114. By way of example, current $I_{DISCH}$ is about 75 microamps (75 μA). Hysteresis comparator 102 monitors the voltage across oscillator capacitor 114 and, in response to the voltage across oscillator capacitor 114 being equal to at least the upper reference or threshold voltage level $V_{OSCH}$, e.g., about 3.5 volts, generates an output signal SYNC that is a logic high voltage. The frequency $F_{OSC}$ of the voltage signal across oscillator capacitor 114 and the frequency of output signal SYNC are substantially the same. In embodiments in which frequency divider circuit 126 divides by two, the frequency of the voltage signal across oscillator capacitor 114 and signal SYNC is twice the switching frequency of the signals in each branch, i.e., the frequency of signal SYNC is twice the frequency of voltage signals PHASE1 and PHASE2. Thus, the output signal SYNC is at a logic high voltage when discharge current $I_{DISCH}$ discharges oscillator capacitor 114. Voltage signal PHASE1 transitions to a logic high voltage and voltage signal PHASE2 transitions to a logic low voltage at approximately time $t_0$. Hysteresis comparator output voltage SYNC remains at a logic high voltage level until oscillator capacitor voltage $V_{OSC}$ is less than reference or threshold voltage level $V_{OSCL}$, e.g., less than 2.5 volts. Because voltage signal PHASE1 and comparator output signal SYNC are at logic high voltage levels, the output signal of AND gate 120 is at a logic high voltage level, which sets clock generation latch 130. Thus, the output voltage Q_CLK1 of clock generation latch 130 is a logic high voltage level. However, because signal SYNCbar is at a logic low voltage the output signal of AND gate 132, i.e., clock signal CLK1, is at a logic low voltage.

At time $t_1$, voltage $V_{OSC}$ across oscillator capacitor 114 crosses below the lower threshold voltage, e.g. 2.5 volts, resulting in output voltage SYNC of hysteresis comparator 102 being a logic low voltage and voltage SYNCbar being a logic high voltage. In response to voltage SYNCbar being a logic high voltage, the output signal of AND gate 132, i.e., clock signal CLK1, becomes a logic high voltage.

At time $t_2$, drive signal DRV1 becomes a logic high voltage, resetting clock generation latch 130, stopping the discharge of oscillator capacitor 114, and beginning a new charging phase for oscillator capacitor 114. Clock signal generation circuit 12 closes switch 108 and opens switch 112 thereby connecting current source 106 to input/output node 104 and disconnecting current sink 110 from input/output node 104. Thus, a current $I_{CH}$ begins to charge oscillator capacitor 114. By way of example, current $I_{CH}$ is about 100 μA. It should be noted that in an ideal case, in which clock generation circuit 12 is operating in a DCM mode, coil 68 is already demagnetized, and drive signal DRV1 becomes a logic high voltage as soon as clock signal CLK1 becomes a logic high voltage, i.e., at time $t_1$.

At time $t_3$, the voltage across oscillator capacitor 114 is equal to at least the upper threshold voltage level, e.g., 3.5 volts, and the output voltage of hysteresis comparator 102 is a logic high voltage. In response to oscillator capacitor 114 being at about 3.5 volts, clock signal generation circuit 12 opens switch 108 and closes switch 112 thereby disconnecting current source 106 from input/output node 104 and connecting current sink 110 to input/output node 104. Thus, a current $I_{DISCH}$ begins to discharge oscillator capacitor 114. By way of example, current $I_{DISCH}$ is about 75 μA. Hysteresis comparator 102 monitors the voltage across oscillator capacitor 114 and, in response to the voltage across oscillator capacitor 114 being about 3.5 volts, generates an output signal SYNC that is a logic high voltage. The frequency $F_{OSC}$ of the voltage signal across oscillator capacitor 114 and the frequency of output signal SYNC are substantially the same. In embodiments in which frequency divider circuit 126 divides by two, the frequency of the voltage signal across oscillator capacitor 114 and signal SYNC is twice the switching frequency of the signals in each branch, i.e., the frequency of signal SYNC is twice the frequency of voltage signals PHASE1 and PHASE2. Thus, the output signal SYNC is at a logic high voltage when discharge current $I_{DISCH}$ discharges oscillator capacitor 114. Voltage signal PHASE1 transitions to a logic low voltage and voltage signal PHASE2 transitions to a logic high voltage at approximately time $t_3$. Hysteresis comparator output voltage SYNC remains at a logic high voltage level until oscillator capacitor voltage $V_{OSC}$ is less than lower reference voltage level $V_{OSCL}$, e.g., less than 2.5 volts. Because voltage signal PHASE2 and comparator output signal SYNC are at logic high voltage levels, the output signal of AND gate 122 is at a logic high voltage level, which sets clock generation latch 134. Thus, the output voltage Q_CLK2 of clock generation latch 134 is a logic high voltage level. However, signal SYNCbar is a logic low voltage therefore the output signal of AND gate 136, i.e., clock signal CLK2, is at a logic low voltage.

At time $t_4$, voltage $V_{OSC}$ across oscillator capacitor 114 crosses below the lower threshold voltage, e.g., 2.5 volts, resulting in output voltage SYNC of hysteresis comparator 102 being a logic low voltage and voltage SYNCbar being a logic high voltage. In response to voltage SYNCbar being a logic high voltage, the output signal of AND gate 136 becomes a logic high voltage.

At time $t_5$, drive signal DRV2 becomes a logic high voltage, resetting clock generation latch 134, stopping the discharge of oscillator capacitor 114, and beginning a new charging phase for oscillator capacitor 114. Clock signal generation circuit 12 closes switch 108 and opens switch 112 thereby connecting current source 106 to input/output node 104 and disconnecting current sink 110 from input/output node 104. Thus, a current $I_{CH}$ begins to charge oscillator capacitor 114. By way of example, current $I_{CH}$ is about 100 μA. It should be noted that in an ideal case, in which clock generation circuit 12 is operating in a DCM mode, coil 78 is already demagnetized, and drive signal DRV2 becomes a logic high voltage as soon as clock signal CLK2 becomes a logic high voltage, i.e., at time $t_4$. The minimum delay from a cycle start of one branch to that of the other branch is labeled $T_{OSC}$ in FIG. 3. The minimum delay between two cycle starts of the same branch is equal to two times $T_{OSC}$.

Figure 4:
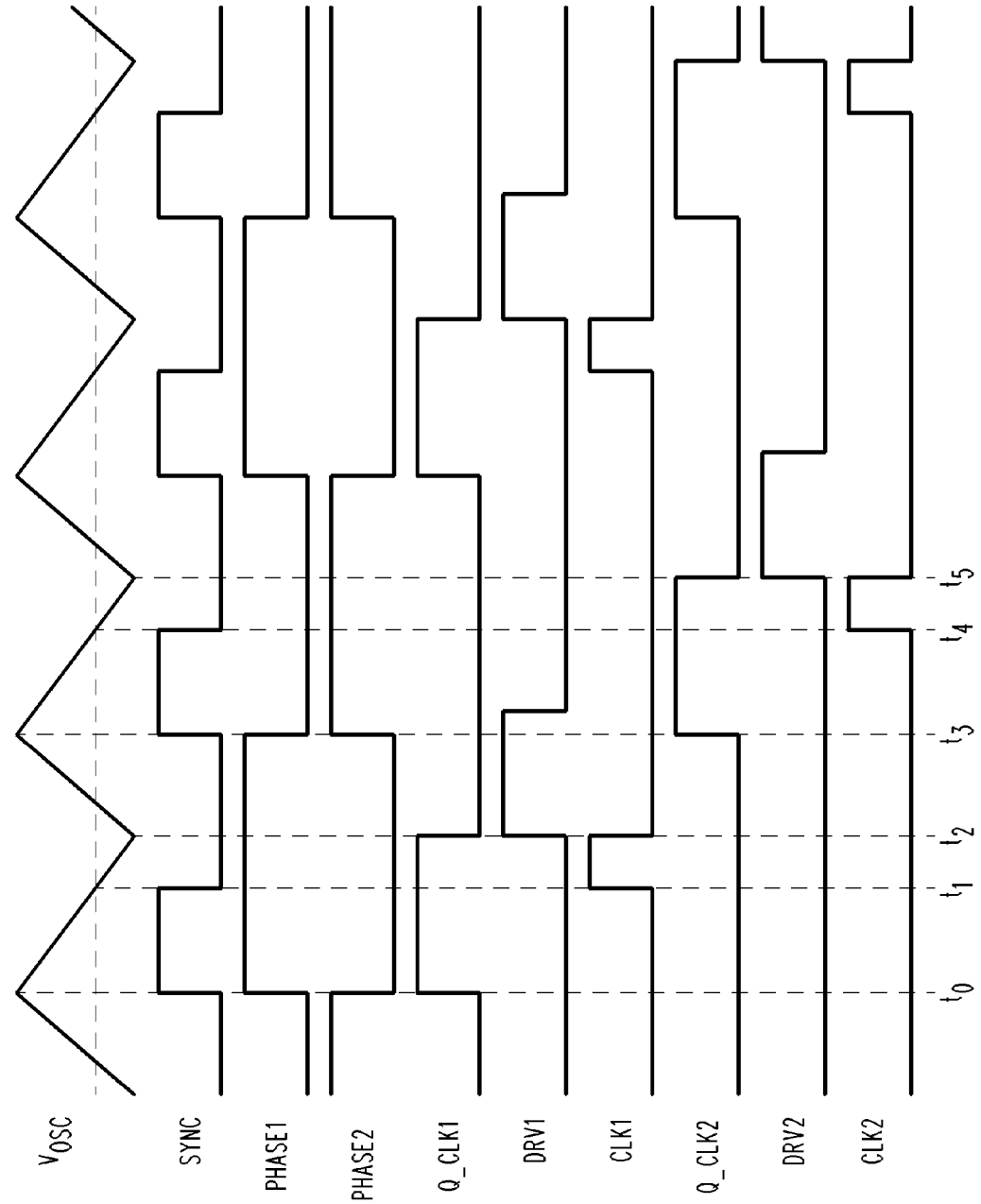
FIG. 4 is a timing diagram for the clock signal generation circuit of FIG. 2 in accordance with another embodiment of the present invention.

FIG. 4 is a timing diagram 160 that is useful for describing the operation of clock signal generation circuit 12 of FIG. 2 in accordance with another embodiment of the present invention in which PFC circuit 10 operates in a CRM mode. In operation, switches 108 and 112 open and close to charge and discharge oscillator capacitor 114. More particularly, at time $t_0$ the voltage across oscillator capacitor 114 is about 3.5 volts and the output voltage of hysteresis comparator 102 is a logic high voltage. In response to oscillator capacitor 114 being at about 3.5 volts, clock signal generation circuit 12 opens switch 108 and closes switch 112 thereby disconnecting current source 106 from input/output node 104 and connecting current sink 110 to input/output node 104. Thus, a current $I_{DISCH}$ begins to discharge oscillator capacitor 114. By way of example, current $I_{DISCH}$ is about 75 µA. Hysteresis comparator 102 monitors the voltage across oscillator capacitor 114 and, in response to the voltage across oscillator capacitor 114 being equal to at least the upper reference or threshold voltage level $V_{OSCH}$, e.g., about 3.5 volts, generates an output signal SYNC that is a logic high voltage. The frequency $F_{OSC}$ of the voltage signal across oscillator capacitor 114 and the frequency of output signal SYNC are substantially the same. In embodiments in which frequency divider circuit 126 divides by two, the frequency of the voltage signal across oscillator capacitor 114 and signal SYNC is twice the switching frequency of the signals in each branch, i.e., the frequency of signal SYNC is twice the frequency of voltage signals PHASE1 and PHASE2. Thus, the output signal SYNC is at a logic high voltage level when discharge current $I_{DISCH}$ discharges oscillator capacitor 114. Voltage signal PHASE1 transitions to a logic high voltage level and voltage signal PHASE2 transitions to a logic low voltage level at approximately time $t_0$. Hysteresis comparator output voltage SYNC remains at a logic high voltage level until oscillator capacitor voltage $V_{OSC}$ is less than reference or threshold voltage level $V_{OSCL}$, e.g., less than 2.5 volts. Because voltage signal PHASE1 and comparator output signal SYNC are at logic high voltage levels, the output signal of AND gate 120 is at a logic high voltage level, which sets clock generation latch 130. Thus, the output voltage Q_CLK2 of clock generation latch 130 is at a logic high voltage level. However, because signal SYNCbar is at a logic low voltage the output signal of AND gate 132, i.e., clock signal CLK1, is at a logic low voltage.

At time $t_1$, voltage $V_{OSC}$ across oscillator capacitor 114 crosses below the lower threshold voltage of 2.5 volts resulting in output voltage SYNC of hysteresis comparator 102 being a logic low voltage and voltage SYNCbar being a logic high voltage. In response to voltage SYNCbar being a logic high voltage, the output signal of AND gate 132, i.e., clock signal CLK1, becomes a logic high voltage. Because PFC circuit 10 operates in a CRM mode, the demagnetization of coil or inductor 68 (shown in FIG. 1) has not finished. Drive signal DRV1 waits until coil 68 has become demagnetized before becoming a logic high voltage. Thus, the discharge of oscillator capacitor 114 is prolonged resulting in an additional delay comprising the additional discharge time of oscillator capacitor 114 plus the time used to recharge oscillator capacitor 114 until it reaches the lower threshold voltage, e.g., 2.5 volts.

At time $t_2$, demagnetization of coil 68 is complete and drive signal DRV1 becomes a logic high voltage, resetting clock generation latch 130, stopping the discharge of oscillator capacitor 114, and beginning a new charging phase for oscillator capacitor 114. Clock signal generation circuit 12 closes switch 108 and opens switch 112 thereby connecting current source 106 to input/output node 104 and disconnecting current sink 110 from input/output node 104. Thus, a current $I_{CH}$ begins to charge oscillator capacitor 114. By way of example, current $I_{CH}$ is about 100 µA.

At time $t_3$, the voltage across oscillator capacitor 114 is about 3.5 volts and has a frequency $F_{OSC}$ and the output voltage of hysteresis comparator 102 is a logic high voltage. In response to oscillator capacitor 114 being at about 3.5 volts, clock signal generation circuit 12 opens switch 108 and closes switch 112 thereby disconnecting current source 106 from input/output node 104 and connecting current sink 110 to input/output node 104. Thus, a current $I_{DISCH}$ begins to discharge oscillator capacitor 114. By way of example, current $I_{DISCH}$ is about 75 µA. Hysteresis comparator 102 monitors the voltage across oscillator capacitor 114 and, in response to the voltage across oscillator capacitor 114 being at least equal to upper reference voltage level $V_{OSCH}$, e.g., about 3.5 volts, generates an output signal SYNC that is a logic high voltage. The frequency $F_{OSC}$ of the voltage signal across oscillator capacitor 114 and the frequency of output signal SYNC are substantially the same. In embodiments in which frequency divider circuit 126 divides by two, the frequency of the voltage signal across oscillator capacitor 114 and signal SYNC is twice the switching frequency of the signals in each branch, i.e., the frequency of signal SYNC is twice the frequency of voltage signals PHASE1 and PHASE2. Thus, the output signal SYNC is at a logic high voltage level when discharge current $I_{DISCH}$ discharges oscillator capacitor 114. Voltage signal PHASE1 transitions to a logic low voltage and voltage signal PHASE2 transitions to a logic high voltage at approximately time $t_3$. Hysteresis comparator output voltage SYNC remains at a logic high voltage level until oscillator capacitor voltage $V_{OSC}$ is less than lower reference voltage level $V_{OSCL}$, e.g., less than 2.5 volts. Because voltage signal PHASE2 and comparator output signal SYNC are at logic high voltage levels, the output signal of AND gate 122 is at a logic high voltage level, which sets clock generation latch 134. Thus, the output voltage Q_CLK2 of clock generation latch 134 is a logic high voltage level. However, signal SYNCbar is a logic low voltage therefore the output signal of AND gate 136, i.e., clock signal CLK2, is at a logic low voltage.

At time $t_4$, voltage $V_{OSC}$ across oscillator capacitor 114 crosses below the lower threshold voltage of 2.5 volts resulting in output voltage SYNC of hysteresis comparator 102 being a logic low voltage and voltage SYNCbar being a logic high voltage. In response to voltage SYNCbar being a logic high voltage, the output signal of AND gate 136 becomes a logic high voltage. Because PFC circuit 10 operates in a CRM mode, the demagnetization of coil or inductor 78 (shown in FIG. 1) has not finished. Drive signal DRV2 waits until coil 78 has become demagnetized before becoming a logic high voltage. Thus, the discharge of oscillator capacitor 114 is prolonged resulting in an additional delay comprising the additional discharge time of oscillator capacitor 114 plus the time used to recharge oscillator capacitor 114 until it reaches the lower threshold voltage, e.g., 2.5 volts.

At time $t_5$, drive signal DRV2 becomes a logic high voltage, resetting clock generation latch 134, stopping the discharge of oscillator capacitor 114, and beginning a new charging phase for oscillator capacitor 114. Clock signal generation circuit 12 closes switch 108 and opens switch 112 thereby connecting current source 106 to input/output node 104 and disconnecting current sink 110 from input/output node 104. Thus, a current $I_{CH}$ begins to charge oscillator capacitor 114. By way of example, current $I_{CH}$ is about 100 µA.

The voltage swing across oscillator capacitor 114 drives the channels or branches of PFC circuit 10. The voltage swing across oscillator capacitor 114 varies in response to the duration of the current cycle of each channel of the plurality of channels, i.e., the duration in which current sources 108 and 112 conduct current for each channel. It should be noted that the duration of the charge and discharge phases are a consequence of the duration of the current cycle which is defined by the current flowing through inductors 64 and 74. Thus, the duration of the current cycle is that of the coil current. Therefore, the voltage swing across the capacitor results from the current duration of the current flowing through each coil. Preferably, the capacitor voltage swing has a minimum value when the duration of the current cycle is less than a predetermined duration. In accordance with the capacitor voltage swinging between 2.5 volts and 3.5 volts, the voltage swing has a minimum value of 1 volt when the current cycle is below a preset duration and increases when the current cycle duration of each channel is longer than the preset duration. For a two channel system or a two branch system in a DCM mode of operation, another cycle cannot start until the charge phase of oscillator capacitor 114 has been completed and it has discharged down to about 2.5 volts.

By now it should be appreciated that a clock signal generation circuit and a method for generating a clock signal have been provided. For a PFC circuit having two branches or stages, an oscillator operates at twice the frequency of each branch. The first cycle of the oscillator capacitor generates a clock signal CLK1 for one phase and a clock signal CLK2 for a subsequent phase. The respective clocks are generated at the end of the discharge phase for the oscillator capacitor. There is a 180 degree phase shift between the phases of the two branches. It should be appreciated that this technique is not limited to PFC circuits having two branches or stages, but is applicable to PFC circuits having three or more branches and three or more phases. Other advantages of the present invention include the allowance of frequency fold-back and its adaptability for use with frequency clamped CRM techniques.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for generating a clock signal for an oscillator of a switched mode power supply operating in at least one of a discontinuous conduction mode (DCM) or a critical conduction mode (CRM), comprising:
    discharging an energy storage element from a first level;
    generating a synchronization signal in accordance with a voltage across the energy storage element, the synchronization signal having a first frequency;
    generating a first signal from the synchronization signal, the first signal having a second frequency;
    generating a second signal from the first signal, the second signal having the second frequency; and
    using the synchronization signal and one of the first and second signals having the second frequency to generate a first clock signal.

2. The method of claim 1, further including using the synchronization signal and another of the first and second signals having the second frequency to generate a second clock signal.

3. The method of claim 2, further including charging the energy storage element using a first current source and discharging the energy storage element using a second current source.

4. The method of claim 3, wherein a discharge current level of the second current source is less than a discharge current level of the first current source.

5. The method of claim 1, wherein generating the synchronization signal includes comparing a voltage level across the energy storage element with a reference voltage.

6. The method of claim 1, wherein using the synchronization signal and the one of the first and second signals having the second frequency to generate the first clock signal includes:
    generating a set signal of a first latch from the synchronization signal and the one of the first and second signals having the second frequency;
    setting an output signal of the first latch; and
    forming the first clock signal using the output signal of the first latch.

7. The method of claim 6, further including resetting the output signal of the first latch.

8. The method of claim 6, further including:
    generating a set signal of a second latch from the synchronization signal and another of the first and second signals having the second frequency;
    setting an output signal of the second latch; and
    forming a second clock signal using the output signal of the second latch.

9. A switched mode power supply operating in DCM or in CRM having a clock generation circuit that includes an oscillator, comprises:
    a comparison circuit having first and second inputs and an output;
    a divider circuit having an input and an output, the input coupled to the output of the comparison circuit;
    a first logic gate having first and second inputs and an output, the first input coupled to the output of the comparison circuit, the second input coupled to the output of the divider circuit; and
    a first latch having an input coupled to the output of the first logic gate, an input coupled to a first driver circuit, and an output coupled to an input of a second logic gate.

10. The switched mode power supply of claim 9, further including:
    a third logic gate having first and second inputs and an output, the first input coupled to the output of the comparison circuit, the second input coupled to the output of the divider circuit; and
    a second latch having an input coupled to the output of the third logic gate, an input coupled to a second driver circuit, and an output coupled to an input of a fourth logic gate.

11. The switched mode power supply of claim 9, further including
    a first switch having first and second current conducting terminals and a control terminal, the first current conducting terminal connected to the first input of the comparison circuit and the control terminal of the switch coupled to an output of the comparison circuit; and a first current source coupled to the second current conducting terminal of the first switch.

\* \* \* \* \*